(12) United States Patent
Rahardjo et al.

(10) Patent No.: US 9,811,305 B2
(45) Date of Patent: Nov. 7, 2017

(54) SYSTEMS AND METHODS FOR REMOTE AND LOCAL HOST-ACCESSIBLE MANAGEMENT CONTROLLER TUNNELED AUDIO CAPABILITY

(71) Applicant: Dell Products L.P., Round Rock, TX (US)

(72) Inventors: Johan Rahardjo, Austin, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 14/825,941

(22) Filed: Aug. 13, 2015

(65) Prior Publication Data
US 2017/0046115 A1 Feb. 16, 2017

(51) Int. Cl.
*G06F 17/00* (2006.01)
*G06F 3/16* (2006.01)

(52) U.S. Cl.
CPC .............. *G06F 3/162* (2013.01); *G06F 3/165* (2013.01); *G06F 3/167* (2013.01)

(58) Field of Classification Search
CPC .......... G06F 3/162; G06F 3/165; G06F 3/167; G06F 13/102; G06F 13/105; G06F 13/107
See application file for complete search history.

(56) References Cited

U.S. PATENT DOCUMENTS

| | | | |
|---|---|---|---|
| 8,028,040 B1* | 9/2011 | Hobbs | G06F 9/45558 370/389 |
| 8,995,670 B2 | 3/2015 | Lambert et al. | |
| 2002/0184373 A1* | 12/2002 | Maes | G10L 15/30 709/228 |
| 2005/0002405 A1* | 1/2005 | Gao | G06F 13/102 370/401 |
| 2006/0206618 A1* | 9/2006 | Zimmer | H04L 69/10 709/231 |
| 2006/0227364 A1* | 10/2006 | Frank | G06Q 30/02 358/1.15 |
| 2006/0265656 A1 | 11/2006 | Lambert et al. | |
| 2008/0148063 A1* | 6/2008 | Hanko | G06F 21/10 713/189 |
| 2011/0066941 A1* | 3/2011 | Chipchase | G06F 3/167 715/716 |

OTHER PUBLICATIONS

High Definition Audio Specification, Revision 1.0a; Jun. 17, 2010.*

* cited by examiner

*Primary Examiner* — Andrew C Flanders
(74) *Attorney, Agent, or Firm* — Jackson Walker L.L.P.

(57) ABSTRACT

In accordance with embodiments of the present disclosure, an information handling system may include a processor and a management controller for providing out-of-band management facilities for management of the information handling system, the management controller configured to emulate a physical audio controller device for interfacing with an operating system executing on the processor such that the management controller proxies audio data between the operating system and one or more audio devices.

32 Claims, 2 Drawing Sheets

SYSTEMS AND METHODS FOR REMOTE AND LOCAL HOST-ACCESSIBLE MANAGEMENT CONTROLLER TUNNELED AUDIO CAPABILITY

TECHNICAL FIELD

The present disclosure relates in general to information handling systems, and more particularly to methods and systems for providing remote and local host-accessible management controller tunneled audio capability.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems are equipped with components to facilitate remote management of such information management systems, whether remote management access is performed via remote desktop, virtual network computing (VNC), or virtual keyboard-video-mouse (KVM). While some existing approaches do support remote sound output and remote sound input, such support is via in-band access only through a main network fabric and not the predominant access path via an out-of-band management network capable of remote management regardless of whether an information handling system is predominantly powered on or off. In other words, out-of-band redirection methods utilizing a management controller of an information handling system do not support remote audio.

Information handling servers typically do not integrate audio controllers, codecs, headphone jacks, and/or microphone jacks due to cost, board space, etc. However, as audio-enabled application programs (e.g., voice-based personal assistant tools such as Siri and Cortana and increasing voice-control capability of browsers and other applications) become more common, consumers are becoming conditioned to expect voice control of information handling systems with feedback. In addition, expanded voice control capability may enhance usability for the sight-impaired or for those having physical impairments preventing the ability to type or operate a pointing device.

SUMMARY

In accordance with the teachings of the present disclosure, the disadvantages and problems associated with providing host-accessible audio capability in an information handling system may be reduced or eliminated.

In accordance with embodiments of the present disclosure, an information handling system may include a processor and a management controller for providing out-of-band management facilities for management of the information handling system, the management controller configured to emulate a physical audio controller device for interfacing with an operating system executing on the processor such that the management controller proxies audio data between the operating system and one or more audio devices.

In accordance with these and other embodiments of the present disclosure, a method may include emulating, by a management controller for providing out-of-band management facilities for management of an information handling system, a physical audio controller device for interfacing with an operating system executing on a processor of the information handling system. The method may also include proxying, by the management controller, audio data between the operating system and one or more audio devices.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
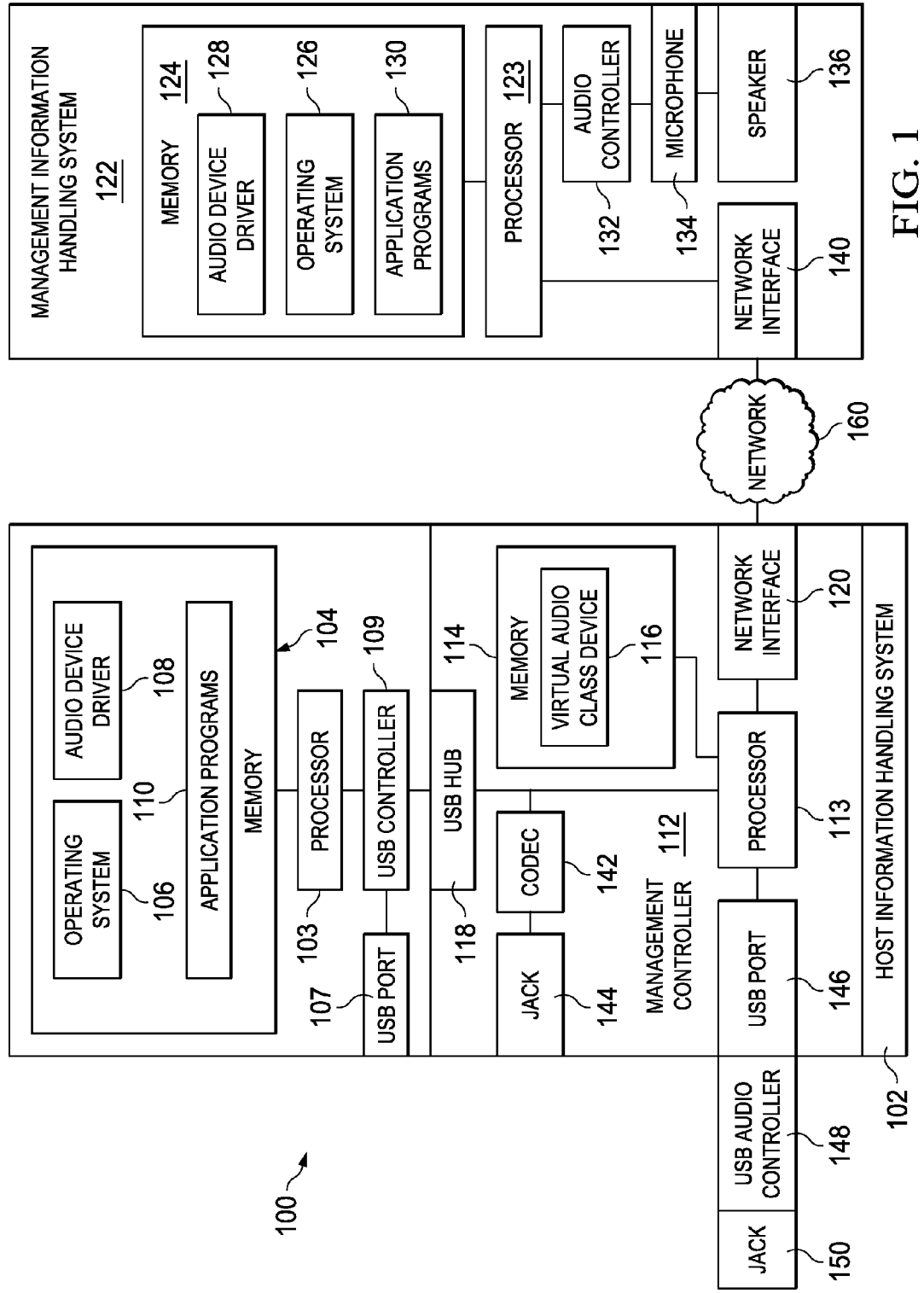
FIG. 1 illustrates a block diagram of an example system for providing remote and local host-accessible audio capability via a management controller, in accordance with embodiments of the present disclosure.
Figure 2:
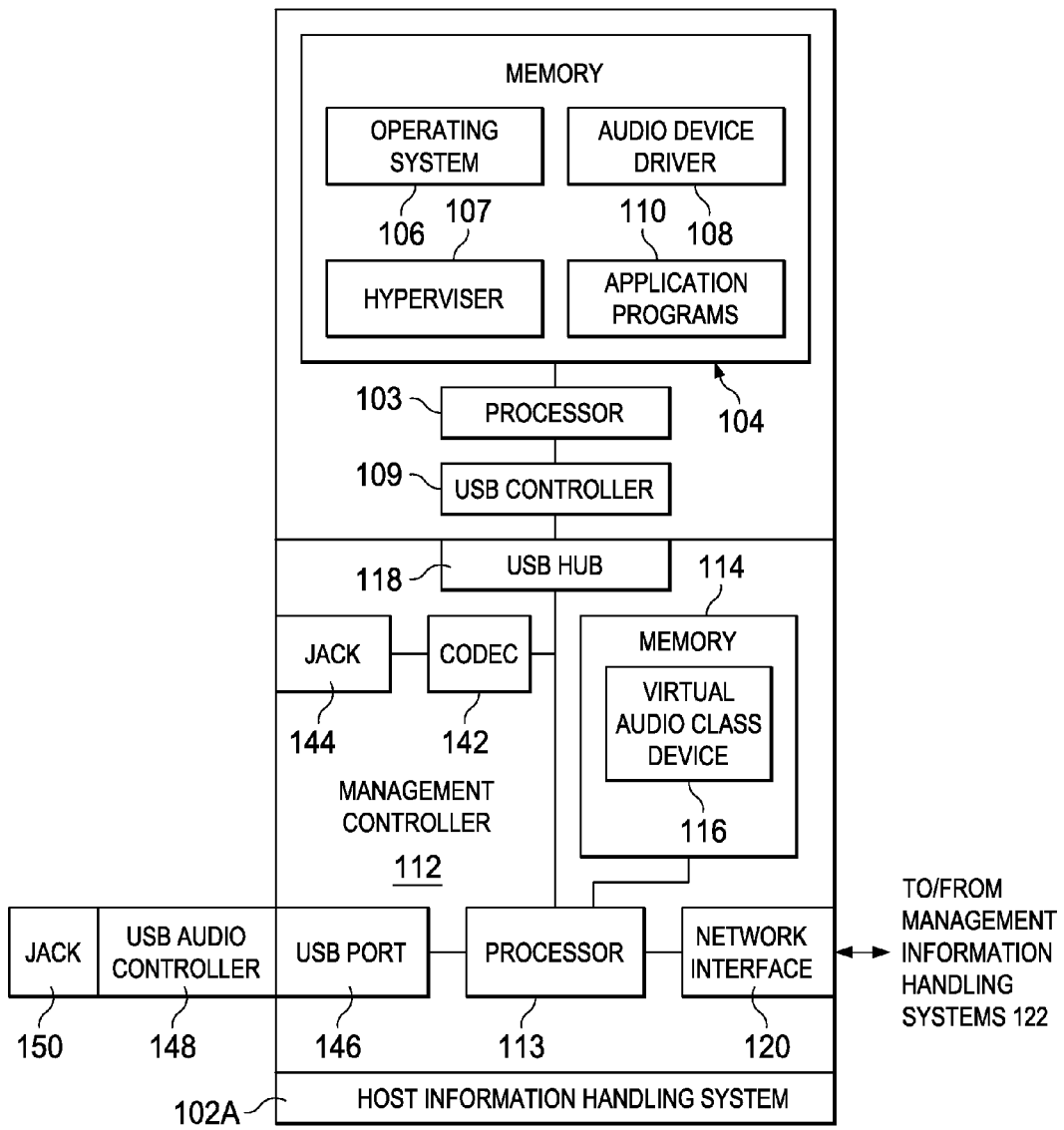
FIG. 2 illustrates a block diagram of an example information handling system having one-to-many audio capability via a management controller, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for providing remote and local accessible audio capability to a host information handling system 102, in accordance with embodiments of the present disclosure. As shown in FIG. 1, system 100 may include host information handling system 102 and a management information handling system 122 communicatively coupled via a network 160.

In some embodiments, host information handling system 102 may be a personal computer. In some embodiments, host information handling system 102 may comprise or be an integral part of a server. In other embodiments, host information handling system 102 may be a portable information handling system (e.g., a laptop, notebook, tablet, handheld, smart phone, personal digital assistant, etc.). As depicted in FIG. 1, host information handling system 102 may include a processor 103, a memory 104 communicatively coupled to processor 103, a Universal Serial Bus (USB) controller 109 communicatively coupled to processor 103, a USB port 107 communicatively coupled to processor 103 via USB controller 109, and a management controller 112 communicatively coupled to processor 103 via USE controller 109.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of host information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to host information handling system 102 is turned off. As shown in FIG. 1, memory 104 may have stored thereon an operating system (OS) 106, an audio device driver 108, and application programs 110. OS 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by OS 106. Active portions of OS 106 may be transferred to memory 104 for execution by processor 103.

Audio device driver 108 may comprise any program of instructions configured to, when read and executed by processor 103, provide an interface between OS 106 and audio hardware or firmware executing on audio hardware. As described in greater detail below, audio device driver 108 may be configured to provide an interface between OS 106 and a virtual audio class device of management controller 112 which emulates an audio controller.

Application programs 110 may comprise any program of executable instructions, or aggregation of programs of executable instructions, configured to, when read and executed by processor 103, interact with OS 106 in order to perform a group of coordinated functions, tasks, or activities. For example, one or more application programs may comprise audio-enabled applications configured to receive and process audio information and/or output audio information.

Although OS 106, audio device driver 108, and application programs 110 are shown in FIG. 1 as stored in memory 104, in some embodiments, one or more of OS 106, audio device driver 108, and application programs 110 may be stored in storage media accessible to processor 103, and active portions of OS 106, audio device driver 108, and/or application programs 110 may be transferred from such storage media to memory 104 for execution by processor 103.

USB controller 109 may be communicatively coupled to processor 103 and comprise any system, device, or apparatus configured to manage and/or control data communications between processor 103 and a USE-enabled device (e.g., management controller 112).

USB port 107 may be communicatively coupled to processor 103 via USB controller 109 and may comprise any system, device, or apparatus configured to provide an interface to couple an external audio device to processor 103.

Management controller 112 may be configured to provide out-of-band management facilities for management of host information handling system 102. Such management may be made by management controller 112 even if host information handling system 102 is powered off or powered to a standby state. Management controller 112 may include a processor 113, memory 114, a USB hub 118, an out-of-band network interface 120 separate from and physically isolated from an in-band network interface (not shown) of host information handling system 102, a coder-decoder (CODEC) 142, a jack 144, and a USB port 146. In certain embodiments, management controller 112 may include or may be an integral part of a baseboard management controller (BMC) or a remote access controller (e.g., a Dell Remote Access Controller or Integrated Dell Remote Access Controller). In other embodiments, management controller 112 may include or may be an integral part of a chassis management controller (CMC). In yet other embodiments, management controller 112 may include or may be an integral part of an enclosure controller.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of host information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

As shown in FIG. 1, memory 114 may have stored therein virtual audio class device 116. Virtual audio class device 116 may include firmware or other executable instructions configured to, when read and executed by processor 113, interface with audio device driver 108 executing on processor 103 and emulate an audio class device (e.g., a CODEC or audio controller of an audio input or audio output device). In addition, virtual audio class device 116 may be configured to, alone or in concert with other firmware executing on processor 113, communicate via network 160 with a corresponding audio device driver 128 to receive audio data from microphone 134 for an application program 110 or communicate data from an application program 110 to speaker 136.

USB hub 118, may be communicatively coupled to processor 113, and may comprise any system, device, or apparatus configured to expands a single USB port interface (e.g., of USB controller 109) into several (e.g., for processor 113, CODEC 142, and USB port 146) so that there are more ports available to couple devices to a host system.

Network interface 120 may comprise any suitable system, apparatus, or device operable to serve as an interface between management controller 112 to one or more other information handling systems. Network interface 120 may enable management controller 112 to communicate using any suitable transmission protocol and/or standard. In these and other embodiments, network interface 120 may comprise a network interface card, or "NIC." In some embodiments, network interface 120 may be configured to couple to another information handling system (e.g., management information handling system 122) via network 160. In some embodiments, network interface 120 may comprise a physical network interface card, or "NIC." In other embodiments, network interface 120 may be implemented as a virtual NIC (e.g., implemented by software configured to execute on processor 113 of management controller 112).

CODEC 142 may be coupled to USB hub 118 and may comprise any system, device, or apparatus implemented in hardware, software, or both configured to encode or decode a digital data stream or signal. For example, when an audio input device (e.g., a microphone) is coupled to jack 144, CODEC 142 may convert analog signals generated by such input device into a corresponding digital data stream for communication to USB hub 118. As another example, when an audio output device (e.g., a speaker) is coupled to jack 144, CODEC 142 may convert a digital data stream received from USB hub 118 to an analog signal corresponding to the digital data stream.

Jack 144 may be coupled to CODEC 142 and may comprise any system, device, or apparatus configured to communicatively couple an audio device (e.g., a microphone or speaker) to CODEC 142.

USB port 146 may be communicatively coupled to processor 113 and may comprise any system, device, or apparatus configured to provide an interface to couple an external audio device to processor 113. As shown in FIG. 1, such an external audio device may include a USB audio controller 148 and a jack 150. USB audio controller 148 may comprise any system, device, or apparatus (e.g., a CODEC) for processing audio data to be output to an audio output device (e.g., speaker) coupled to jack 150 and/or for processing audio data input from jack 150 from an audio input device (e.g., microphone).

In addition to processor 103, memory 104, USE controller 109, and management controller 112, host information handling system 102 may include one or more other information handling resources.

In some embodiments, management information handling system 122 may be a personal computer. In other embodiments, management information handling system 122 may comprise or be an integral part of a server. In yet other embodiments, management information handling system 122 may be a portable information handling system (e.g., a laptop, notebook, tablet, handheld, smart phone, personal digital assistant, etc.). As depicted in FIG. 1, management information handling system 122 may include a processor 123, a memory 124 communicatively coupled to processor 123, a network interface 140 communicatively coupled to processor 123, an audio controller 132 communicatively coupled to processor 123, a microphone 134 communicatively coupled to audio controller 132, and a speaker 134 communicatively coupled to audio controller 132.

Processor 123 may include any system, device, or apparatus configured to interpret and/or execute program instructions and/or process data, and may include, without limitation, a microprocessor, microcontroller, DSP, ASIC, or any other digital or analog circuitry configured to interpret and/or execute program instructions and/or process data. In some embodiments, processor 123 may interpret and/or execute program instructions and/or process data stored in memory 124 and/or another component of management information handling system 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to management information handling system 122 is turned off. As shown in FIG. 1, memory 124 may have stored thereon an operating system (OS) 126, an audio device driver 128, and application programs 130. OS 126 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by OS 126.

Active portions of OS 126 may be transferred to memory 124 for execution by processor 123.

Audio device driver 128 may comprise any program of instructions configured to, when read and executed by processor 123, provide an interface between OS 126 and audio hardware or firmware executing on audio hardware. As described in greater detail below, audio device driver 128 may be configured to provide an interface between OS 126 and audio controller 132. In addition, audio device driver 128 may also be configured to communicate with virtual audio class device 116 executing on management controller 112 in order to facilitate remote audio capability with host information handling system 102.

Application programs 130 may comprise any program of executable instructions, or aggregation of programs of executable instructions, configured to, when read and executed by processor 123, interact with OS 126 in order to perform a group of coordinated functions, tasks, or activities. For example, one or more application programs may comprise audio-enabled management applications configured to receive and process audio information communicated from host information handling system 102 (e.g., for playback on speaker 136) and/or communicate audio information to host information handling system 102 (e.g., audio input from microphone 134).

Although OS 126, audio device driver 128, and application programs 130 are shown in FIG. 1 as stored in memory 124, in some embodiments, one or more of OS 126, audio device driver 128, and application programs 130 may be stored in storage media accessible to processor 123, and active portions of OS 126, audio device driver 128, and/or application programs 130 may be transferred from such storage media to memory 124 for execution by processor 123.

Network interface 140 may comprise any suitable system, apparatus, or device operable to serve as an interface between management information handling system 122 and one or more information handling systems. Network interface 140 may enable management information handling system 122 to communicate using any suitable transmission protocol and/or standard. In these and other embodiments, network interface 140 may comprise a NIC.

Audio controller 132 may be communicatively coupled to processor 123 and may comprise any system, device, or apparatus (e.g., a CODEC) for processing audio data to be output to an audio output device (e.g., speaker 136) coupled to audio controller 132 and/or for processing audio data input from an audio input device (e.g., microphone 134).

Microphone 134 may be communicatively coupled to audio controller 132 and comprise any acoustic-to-electric transducer or sensor that converts sound into an electrical signal.

Speaker 136 may be communicatively coupled to audio controller 132 and comprise any electroacoustic transducer which converts an electrical audio signal into a corresponding sound.

In addition to processor 123, memory 124, network interface 140, audio controller 132, microphone 134, and speaker 136, management information handling system 122 may include one or more other information handling resources.

In operation, management controller 112 may, through virtual audio class device 116, emulate an audio controller to processor 103 and its associated chipset. Notably, addition of virtual audio class device 116 to provide such emulation does not add additional hardware to information handling system 102, which may be crucial given space limitations of information handling systems.

In addition, management controller 112 may be configured to capture audio data output (e.g., intended for playback on a speaker) and communicate such data to management information handling system 122. In some embodiments, management controller 112 may communicate such audio data output by merging such data with a virtual KVM session data stream between management information handling system 122 and management controller 112. Further, an application program 130 (e.g., a virtual KVM application) may extract such audio data output from the datastream and output it to speaker 136.

Similarly, management information handling system 122 may capture and process inbound audio streams (e.g., from microphone 134) and an application program 130 (e.g., a virtual KVM application) may communicate such data to host information handling system 102 (e.g., by merging such data with virtual KVM session data). Accordingly, management controller 112 may serve as a microphone proxy to receive an inbound sound data stream from management information handling system 122 and redirect such inbound data stream to the management controller-emulated audio controller's audio input.

In these and other embodiments, management controller 112 and/or application programs 130 may also be configured to permit control by a user at management information handling system 122 to enable or disable remote audio features. For example, in some embodiments, an application program 130 (e.g., a remote management console application) may be configured to "mute" the local to remote microphone functionality, such that management information handling system 122 ceases capturing, processing, and forwarding inbound audio data to host information handling system 102, which may reduce management network data. Similarly, in some embodiments, an application program 130 (e.g., a remote management console application) may be configured to communicate a request to "mute" the local to remote speaker functionality, such that management controller 112 ceases capturing, processing, and forwarding outbound speaker data to management information handling system 122, which may also reduce management network data. As another example, an application program 130 (e.g., a remote management console application) may alter the volume of sound output to speaker 136 or relay a request to management controller 112 to do so.

In these and other embodiments, management controller 112 and/or application programs 130 may also be configured to permit control by a user at management information handling system 122 to control management controller 112 using voice commands. In such embodiments, management controller 112 may filter inbound audio data from management information handling system 122 for a particular word or phrase. Once such particular word or phrase is matched, management controller 112 may cease forwarding inbound audio data and instead responds to subsequent inbound audio data as if it includes one or more voice commands for controlling or managing management controller 112. Such voice-activated management controller control mode may persist until such time as another voice command is given to cease control, after which management controller 112 may forward inbound audio data.

Furthermore, in some embodiments, simultaneous local and remote use of speakers and microphones may be enabled. Management controller 112 may provide this functionality by merging remote (e.g., from management information handling system 122) and local (e.g., a microphone coupled to jack 144 or jack 150) audio for processing by processor 103 and/or splitting of outbound speaker sound to a local speaker (e.g., a speaker coupled to jack 144 or jack 150, or to an audio device coupled to USB port 107) and to management information handling system 122 for playback at speaker 136.

In these and other embodiments, management controller 112 may also be configured to detect whether an audio device (e.g., a speaker or microphone) is coupled externally to USE port 107. In response to detecting an audio device coupled to USB port 107, management controller 112 may communicate an indication to processor 103 that that local audio is enabled, and when management controller 112 establishes a KVM session with host information handling system 102, audio data may be communicated to or received from such audio device and merged with the audio data processed by virtual audio class device 116.

FIG. 2 illustrates a block diagram of an example information handling system 102A having one-to-many audio capability via management controller 112, in accordance with embodiments of the present disclosure. Information handling system 102A may be similar to information handling system 102, except that memory 104 may include hypervisor 107, and management controller 112 may additionally be configured to emulate a plurality of virtual audio controllers and management communication between one or more management information handling systems 122 and multiple virtual machines instantiated on information handling system 102A.

Hypervisor 107 may comprise software and/or firmware generally operable to allow multiple virtual machines and/or operating systems to run on a single computing system (e.g., host information handling system 102) at the same time. This operability is generally allowed via virtualization, a technique for hiding the physical characteristics of computing system resources (e.g., physical hardware of the computing system) from the way in which other systems, applications, or end users interact with those resources. Hypervisor 107 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, hypervisor 107 may comprise a specially-designed OS with native virtualization capabilities. In another embodiment, hypervisor 107 may comprise a standard OS with an incorporated virtualization component for performing virtualization.

In another embodiment, hypervisor 107 may comprise a standard OS running alongside a separate virtualization application. In this embodiment, the virtualization application of hypervisor 107 may be an application running above the OS (e.g., OS 106) and interacting with computing system resources only through the OS. Alternatively, the virtualization application of hypervisor 107 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of hypervisor 107 may, on all levels, interact directly with computing system resources (e.g., similar to the way the OS interacts directly with computing system resources, or as firmware running on computing system resources) without utilizing the OS, although still interacting with the OS to coordinate use of computing system resources. Active portions of hypervisor 107 may be transferred from storage media to memory 104 for execution by processor 103.

In operation, management controller 112 may receive from hypervisor 107 a request to attach or detach a specific number of virtual audio controllers to match the number of virtual machines executing on hypervisor 107. In response, management controller 112 may operate such number of audio streams such that hypervisor 107 concurrently proxies multiple audio streams concurrently between virtual machines and remote management information handling systems 122.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
 a processor; and
 a management controller for providing out-of-band management facilities for management of the information handling system, the out-of-band management facilities including management of the information handling system while the information handling system is in a physically powered-off state, wherein the management controller is configured to emulate a physical audio controller device for interfacing with an operating system executing on the processor such that the management controller is configured to proxy audio data between the operating system and one or more audio devices.

2. The information handling system of claim 1, wherein the management controller is configured to capture audio output data of the operating system and communicate the audio output data to a remote information handling system.

3. The information handling system of claim 2, wherein the remote information handling system is configured to play sounds associated with the audio output data to a speaker local to the remote information handling system.

4. The information handling system of claim 2, wherein the management controller is configured to communicate the audio output data to the remote information handling system by merging the audio output data with keyboard-video-mouse data communicated to the remote information handling system.

5. The information handling system of claim 2, wherein the management controller is configured to output the audio output data to a speaker local to the information handling system and coupled to the management controller via a port of the management controller.

6. The information handling system of claim 2, wherein the management controller is configured to, in response to a mute command from the remote information handling system, cease capturing audio output data of the operating system and cease communicating the audio output data to the remote information handling system.

7. The information handling system of claim 1, wherein the management controller is configured to receive audio input data from a remote information handling system and communicate the audio input data to the operating system for use by the operating system or an application program executing on the operating system.

8. The information handling system of claim 7, wherein the audio input data is derived from sound incident upon a microphone local to the remote information handling system.

9. The information handling system of claim 7, wherein the audio input data is integral to keyboard-video-mouse data communicated from the remote information handling system.

10. The information handling system of claim 7, wherein the management controller is configured to merge audio data associated with a microphone local to the information handling system with the audio input data.

11. The information handling system of claim 7, wherein the management controller is further configured to:
filter the audio input data for a voice command to enter a control mode of the management controller;
enter the control mode in response to receipt of the voice command; and
perform management actions upon the management controller in response to additional voice commands received during the control mode.

12. The information handling system of claim 11, wherein the management controller is further configured to:
in the control mode, filter the audio input data for a second voice command to exit the control mode; and
exit the control mode in response to receipt of the second voice command.

13. The information handling system of claim 7, wherein the management controller is further configured to, in response to a mute command received at the remote information handling system, cease communicating the audio input data to the information handling system.

14. The information handling system of claim 1, wherein the management controller is configured to emulate a plurality of physical audio controller devices, each emulated physical audio controller device for interfacing with a respective guest operating system executing on the processor such that the management controller is configured to proxy audio data between each guest operating system and one or more audio devices.

15. The information handling system of claim 1, wherein the management controller is configured to:
detect a presence of an audio device externally coupled to an external port of the information handling system;
communicate an indication to the operating system of the presence of the audio device externally coupled to the external port; and
proxy audio data between the operating system and the audio device externally coupled to the external port.

16. The information handling system of claim 1, wherein the management controller is further configured to, in response to a volume command received at the remote information handling system, control a volume of the proxied audio data.

17. A method comprising:
emulating, by a management controller for providing out-of-band management facilities for management of an information handling system, a physical audio controller device for interfacing with an operating system executing on a processor of the information handling system, wherein the out-of-band management facilities include management of the information handling system while the information handling system is in a physically powered-off state; and
proxying, by the management controller, audio data between the operating system and one or more audio devices.

18. The method of claim 17, further comprising:
capturing, by the management controller, audio output data of the operating system; and
communicating, by the management controller, the audio output data to a remote information handling system.

19. The method of claim 18, wherein the remote information handling system is configured to play sounds associated with the audio output data to a speaker local to the remote information handling system.

20. The method of claim 18, wherein communicating the audio output data to the remote information handling system further comprises merging the audio output data with keyboard-video-mouse data communicated to the remote information handling system.

21. The method of claim 18, further comprising outputting, by the management controller, the audio output data to a speaker local to the information handling system and coupled to the management controller via a port of the management controller.

22. The method of claim 18, further comprising in response to a mute command from the remote information handling system, ceasing capture of audio output data of the operating system and ceasing communication of the audio output data to the remote information handling system.

23. The method of claim 17, further comprising receiving, by the management controller, audio input data from a remote information handling system and communicating the audio input data to the operating system for use by the operating system or an application program executing on the operating system.

24. The method of claim 23, wherein the audio input data is derived from sound incident upon a microphone local to the remote information handling system.

25. The method of claim 23, wherein the audio input data is integral to keyboard-video-mouse data communicated from the remote information handling system.

26. The method of claim 23, further comprising merging, by the management controller, audio data associated with a microphone local to the information handling system with the audio input data.

27. The method of claim 23, further comprising:
filtering, by the management controller, the audio input data for a voice command to enter a control mode of the management controller;
entering, by the management controller, the control mode in response to receipt of the voice command; and
performing management actions within the management controller in response to additional voice commands received during the control mode.

28. The method of claim 27, further comprising:
in the control mode, filtering, by the management controller, the audio input data for a second voice command to exit the control mode; and
exiting the control mode in response to receipt of the second voice command.

29. The method of claim 23, wherein the management controller is further configured to, in response to a mute command received at the remote information handling system, cease forwarding the audio input data to the information handling system.

30. The method of claim 17, wherein emulating comprises emulating a plurality of physical audio controller devices, each emulated physical audio controller device for interfacing with a respective guest operating system executing on the processor such that the management controller proxies audio data between each guest operating system and one or more audio devices.

31. The method of claim 17, further comprising:
detecting, by the management controller, a presence of an audio device externally coupled to an external port of the information handling system;
communicating, by the management controller, an indication to the operating system of the presence of the audio device externally coupled to the external port; and
proxying, by the management controller, audio data between the operating system and the audio device externally coupled to the external port.

32. The method of claim 17, further comprising, in response to a volume command received at the remote information handling system, controlling, by the management controller, a volume of the proxied audio data.

* * * * *